T. J. SLOAN.
Grinding Mill.
No. 54,262,
Patented April 24, 1866.
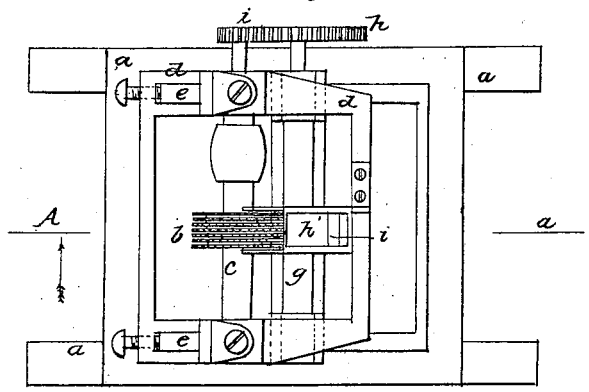
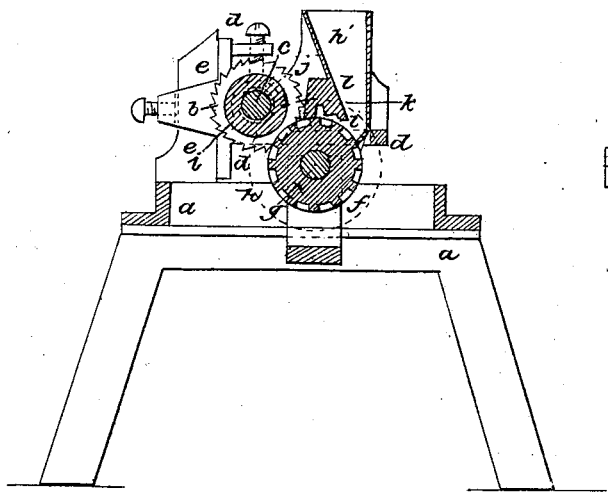
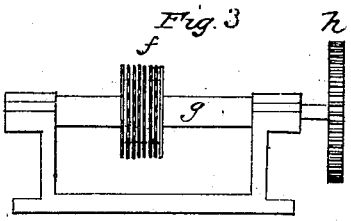

UNITED STATES PATENT OFFICE.

THOMAS J. SLOAN, OF NEW YORK, N. Y., ASSIGNOR TO JOHN G. SLOAN, OF PARIS, FRANCE.

IMPROVEMENT IN GRINDING-MILLS.

Specification forming part of Letters Patent No. 54,262, dated April 24, 1866.

*To all whom it may concern:*

Be it known that I, THOMAS J. SLOAN, of the city, county, and State of New York, have invented certain new and useful Improvements in Machinery for Grinding or Granulating Grain; and I hereby declare that the following is a full, clear, and exact description thereof, reference being had to the accompanying drawings, making part of this specification, in which—

Figure 1 is a plan; Fig. 2, a vertical section taken in the plane of the line A $a$, Fig. 1; and Fig. 3, a front elevation of the disks $f$ and shafts $g$.

The same letters indicate like parts in all the figures.

My said invention relates to machinery for grinding or granulating grain by the shearing action of a series of rotating saws working between a series of disks having recesses to constitute buckets to receive and carry the grain to the action of the saws, which reduce it by a species of shearing action instead of the crushing action which takes place between mill-stones.

In the accompanying drawings, $a$ represents a suitable frame, and $b$ a series of circular saws mounted on a shaft, $c$, with washers interposed, so as to leave spaces between the saws, which spaces I prefer to have a little wider than the thickness of the saws. The teeth are of the usual form of saw-teeth, but without lateral set, such as usually given to saw-teeth for sawing wood. The shaft $c$ is mounted in suitable boxes in a frame, $d$, fitted to standards $e$ $e$ of the main frame $a$, on which it can slide vertically for adjustment, and secured at any elevation desired by temper-screws, as represented, but other modes of adjustment may be substituted.

Another series of circular disks, $f$, with washers interposed, are mounted on another and parallel shaft, $g$, whose journals are fitted to boxes in the main frame $a$. The two shafts $c$ and $g$ are geared to turn in opposite directions—the one, $c$, at a much higher velocity than the other, $g$—by means of a cog-wheel, $h$, on the shaft $g$ and a pinion, $i$, on the shaft $c$.

The disks of the series $f$ should be placed at such distance apart as to permit the saws of the series $b$ to work freely between them, but so that they will just clear as they perform therein a shearing operation. The peripheries of the disks $f$ are notched with square notches at equal distances apart, and of such depth as to form a series of buckets to receive and hold the grain while it is being cut and granulated by the series of saws.

The shaft $g$ is represented as being placed below and forward of the shaft $c$, the axis of the two being in a plane inclined at an angle of about forty-five degrees; but this relative position is by no means essential. The distance between the two shafts should be such as to have the points of the teeth of the saws extend a little below the notches or recesses in the disks $f$, so that no portion of the grain in the recesses shall escape without being acted upon by the saws.

$h'$ is a hopper to supply grain to the buckets in the series of disks $f$ by gravity. It is attached to the frame $d$, and its form and the capacity of its upper part are not material, but the structure of its lower part is important. It should fit close to the periphery of the series of disks $f$ without touching them. The lower opening, at $i'$, should be of sufficient length to extend over the whole length of the series of disks $f$. The rear part of this hopper, $j$, extends to within a short distance of the series of saws, and for some distance its under face is close to the periphery of the disks $f$ without touching, so as to prevent the grain from getting out of the recesses or buckets; but between this part and the inside or feeding part it is of a peculiar form important to be understood. As the series of buckets in the disks pass under the hopper the grain would not have time to fall into them unless the series of disks should be turned too slowly to grind economically; and if that edge of the hopper which is toward the series of saws was extended down to the periphery of the disk, and they (the disks) should be rotated at a sufficient velocity to grind economically, the grain could only partially enter the buckets, and in that case the back edges of the buckets and the edge of the hopper would act as shears to cut up the grain in a very imperfect manner.

To avoid the difficulty above pointed out the lower back edge of the hopper, at $k$, should be at least as far from the periphery of the disks as the full size of the kind of grain for which the machine is intended, so that the grains may pass under it; and just back of the inner edge the under surface curves slightly upward to leave room for the grain to turn over and rebound, and then it continues in the form of an inclined plane, gradually approaching the periphery of the disks to within a short distance to force the grains into the bucket—say about one-third the diameter of a grain. Back of this there is an upward recess, $l$, and the back of this recess, at $j$, extends down to the periphery of the disks, so as just to clear them, as before stated, and the edge at $j$ should be square and sharp to cut off any portion of the grains that may project above the periphery of the disks, and thus enable the buckets filled with grain to pass freely under the remaining portion of the back part of the hopper to the series of saws by which the grain is reduced.

The recess $l$ I term an "overflow," because the object of it is to receive freely the particles of grain which are cut off in passing the back edge, $j$, and permit these particles to roll over freely and fall into the buckets. I have found one such overflow to answer a good purpose; but I contemplate using two—one back of the other—or even a greater number than two.

The above-described structure of the rear part of the hopper is essential in grinding rapidly and economically; but for grinding slowly it may be dispensed with, in which case the width of the lower part of the hopper should be equal to about one-quarter of the circumference of the disks.

As the buckets in the disks filled with grain pass from under the back portion, $j$, of the hopper they reach the periphery of the saws, the teeth of which, passing between and close to the sides of the disks and moving at a much higher velocity, reduce the grain by a series of shearing and cutting actions, several teeth of each saw acting in succession upon the grain contained in any one bucket. By these repeated actions the grain is reduced to a granular state with all the grains of the same or nearly the same size, instead of being reduced by a species of crushing action, such as takes place in the ordinary mill.

I have found that saws from eight to sixteen inches diameter and from one-sixteenth to one sixty-fourth of an inch in thickness work well, the other parts being about in the proportions represented; and I have run the saws with success at various velocities at from six hundred to two thousand five hundred revolutions, and the disks have been run at a velocity from one-seventh to one-fifteenth of the velocity of the saws. The greater the velocity of the saws relatively to the velocity of the disks the finer will be the product with a given thickness of saws. The thinner the saws are made the finer will be the product.

What I claim as my invention, and desire to secure by Letters Patent, is—

1. The combination of the series of saws with the series of disks formed with recesses or buckets in their peripheries for carrying and holding the grain to and while it is subjected to the action of the saws, the saws rotating at a higher velocity than the disks, substantially as and for the purposes described.

2. The hopper for supplying the grain to the buckets in the series of disks, in combination with the series of disks and the series of saws, substantially as and for the purpose described.

3. In combination with the series of saws and with the series of disks, constructing the lower part of the hopper with an overflow and inclined surfaces leading thereto, substantially as and for the purpose described.

THOS. J. SLOAN.

Witnesses:
  WM. H. BISHOP,
  ANDREW DE LACY.